US012658058B2

(12) United States Patent
Raghavan

(10) Patent No.: US 12,658,058 B2
(45) Date of Patent: Jun. 16, 2026

(54) VEHICLE PATH DEVIATION REPORTING AND UPDATING

(71) Applicant: QUALCOMM Incorporated, San Diego, CA (US)

(72) Inventor: Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/306,790

(22) Filed: Apr. 25, 2023

(65) Prior Publication Data

US 2024/0363009 A1 Oct. 31, 2024

(51) Int. Cl.
| | |
|---|---|
| *H04W 4/029* | (2018.01) |
| *G08G 5/26* | (2025.01) |
| *H04W 4/021* | (2018.01) |
| *H04W 4/40* | (2018.01) |

(52) U.S. Cl.
CPC .............. *G08G 5/26* (2025.01); *H04W 4/021* (2013.01); *H04W 4/029* (2018.02); *H04W 4/40* (2018.02)

(58) Field of Classification Search
CPC ......... H04W 4/029; H04W 4/44; H04W 4/40; H04W 4/021; G08G 5/26
See application file for complete search history.

(56) References Cited

U.S. PATENT DOCUMENTS

| | | | |
|---|---|---|---|
| 4,741,163 A | 5/1988 | Hidaka et al. | |
| 9,842,437 B2 * | 12/2017 | Biemer .................. | G07C 5/008 |

| | | | |
|---|---|---|---|
| 2005/0021745 A1 | 1/2005 | Bookman et al. | |
| 2012/0226548 A1 | 9/2012 | Hanna | |
| 2013/0224721 A1 | 8/2013 | Gilling | |
| 2016/0152192 A1 * | 6/2016 | Takahashi ........... | B60R 11/0247 |
| | | | 381/365 |
| 2021/0029505 A1 * | 1/2021 | Kumar .................. | H04L 67/535 |
| 2021/0269059 A1 | 9/2021 | Djuric et al. | |

(Continued)

FOREIGN PATENT DOCUMENTS

| | | | |
|---|---|---|---|
| JP | 2016105557 A | 6/2016 | |

OTHER PUBLICATIONS

KR 20040089555 A with English translation; date filed Apr. 10, 2004; date published Oct. 21, 2004. (Year: 2004).*

(Continued)

*Primary Examiner* — Calvin Cheung
(74) *Attorney, Agent, or Firm* — NORTON ROSE FULBRIGHT US LLP

(57) ABSTRACT

This disclosure provides systems, methods, and devices for wireless communication that support vehicle path deviation reporting and updating. In a first aspect, a method of wireless communication performed at a vehicle includes generating movement data based on traversing from a first location to a second location. The traversing is based on path information that indicates a plurality of waypoints designated to be traversed by the vehicle. The method also includes transmitting statistical information generated based on the movement data and the plurality of waypoints. The movement data is associated with an actual path of the vehicle. The plurality of waypoints are associated with an interpolated path of the vehicle. Other aspects and features are also claimed and described.

16 Claims, 7 Drawing Sheets

(56) References Cited

U.S. PATENT DOCUMENTS

2022/0404484 A1    12/2022   Saha et al.

OTHER PUBLICATIONS

Eslamiat H., et al., "Autonomous Waypoint Planning, Optimal Trajectory Generation and Nonlinear Tracking Control for Multi-Rotor UAVs", 2019 18th European Control Conference (ECC), EUCA, Napoli, Italy, Jun. 25-Jun. 28, 2019, Jun. 25, 2019, pp. 2695-2700, XP033595423, abstract, section I, section v, figures 1-2.
International Search Report and Written Opinion—PCT/US2024/021913—ISA/EPO—Jun. 18, 2024 (2301657WO).
Stanczak J (Nokia)., et al., "On Flight Path Plan (FPP) for UAVs—Role, Content and Reporting Aspects", 3GPP TSG-RAN WG2 Meeting #120, R2-2212269, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14-Nov. 18, 2022, Nov. 3, 2022, 5 Pages, XP052216353, abstract, section 1-3, figure 1.

* cited by examiner

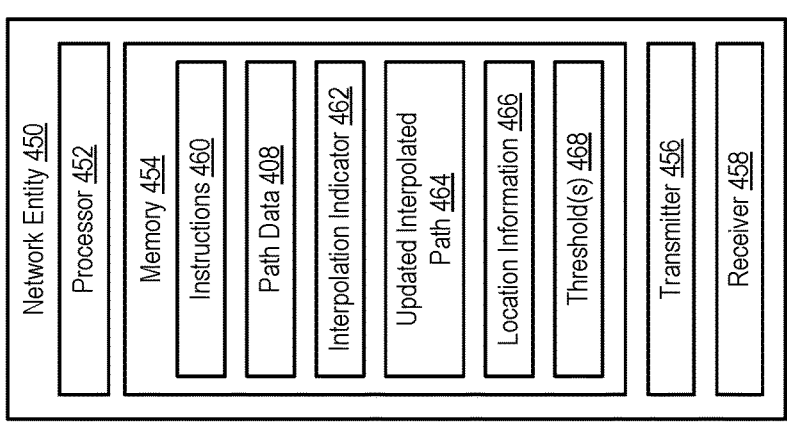
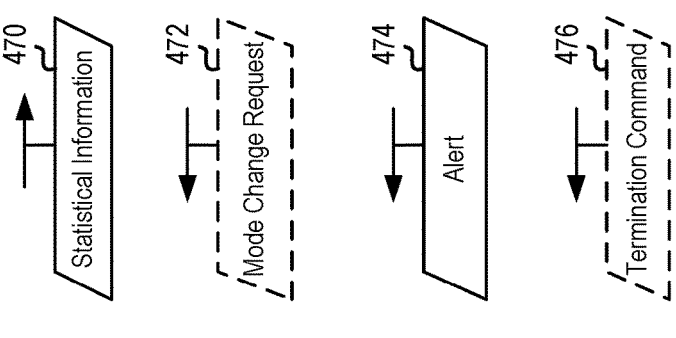
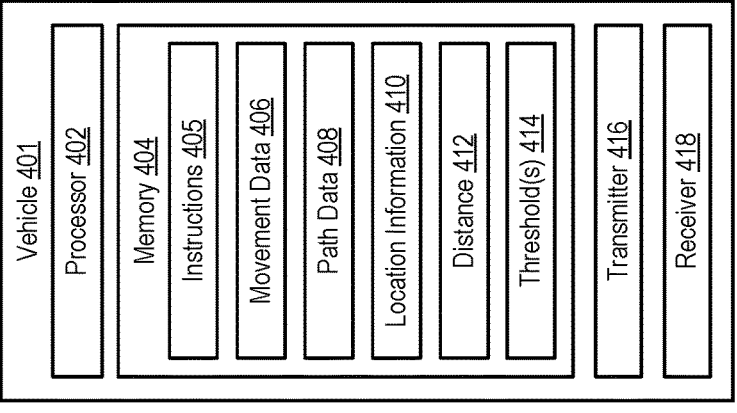
*FIGURE 4*

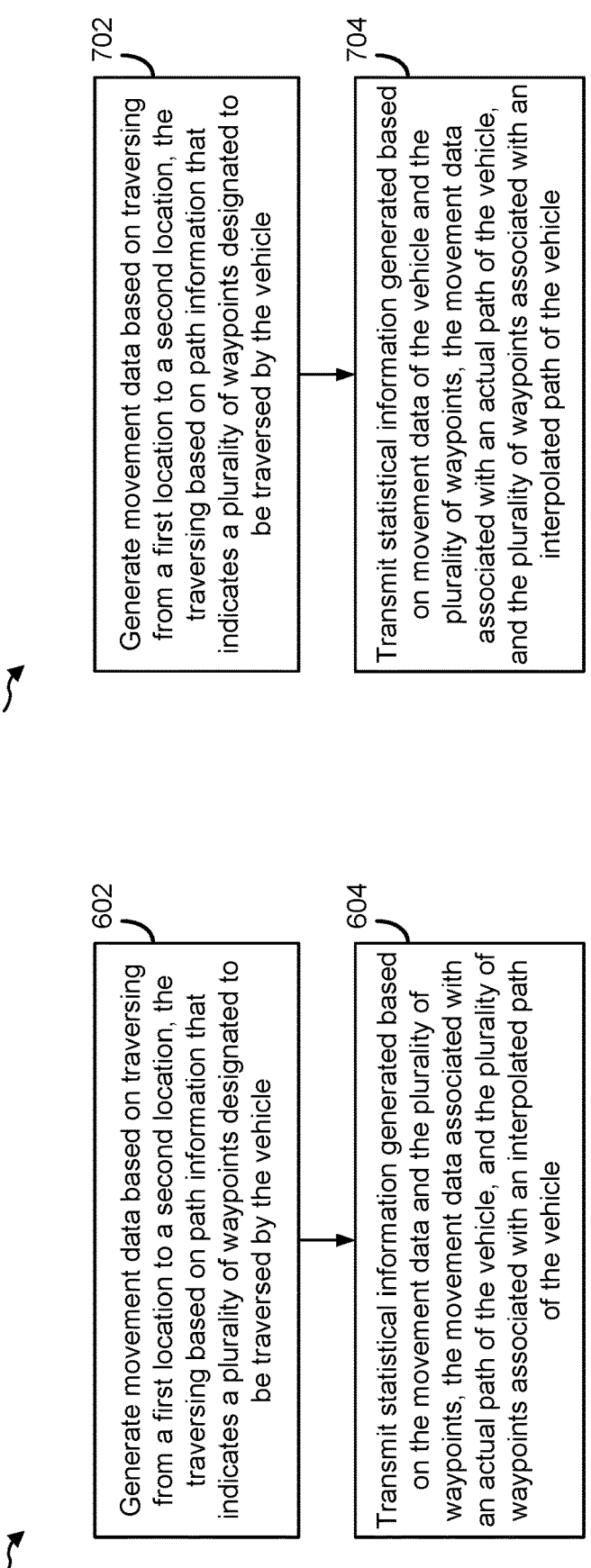

702

Generate movement data based on traversing from a first location to a second location, the traversing based on path information that indicates a plurality of waypoints designated to be traversed by the vehicle

704

Transmit statistical information generated based on movement data of the vehicle and the movement data associated with a plurality of waypoints, the movement data associated with an actual path of the vehicle, and the plurality of waypoints associated with an interpolated path of vehicle

Generate movement data based on traversing from a first location to a second location, the traversing based on path information that indicates a plurality of waypoints designated to be traversed by the vehicle

604

Transmit statistical information generated based on the movement data and the plurality of waypoints, the movement data associated with an actual path of the vehicle, and the plurality of waypoints associated with an interpolated path of the vehicle

VEHICLE PATH DEVIATION REPORTING AND UPDATING

TECHNICAL FIELD

Aspects of the present disclosure relate generally to wireless communication systems, and more particularly, to vehicle path deviation reporting and updating within wireless communication systems, such as by autonomous or semi-autonomous vehicles. Some features may enable and provide improved vehicle tracking, increased permissible use area for autonomous vehicles, improved power efficiency, a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A growing focus of research in wireless networks is the intersection of wireless communications and autonomous and semi-autonomous vehicles. As a particular example, delivery companies are researching technology to enable unmanned aerial vehicles (UAVs), also known as drones or drone aircrafts, to perform deliveries of consumer goods. As UAVs become more popular, standards bodies are implementing UAV and autonomous vehicle communications into wireless communication standards to support uniform rules and technologies. One concern related to autonomous vehicles, particularly to UAVs, is preventing UAVs from traversing restricted areas. For example, governments, safety regulators, private industries, and the like, may want to prevent UAVs from traversing the airspace above or near critical infrastructure such as airports, railway stations, sensitive government locations, industrial facilities, etc. For this reason, a UAV may provide flight path information, such as a list of waypoints to be traversed by the UAV and associated estimated arrival times, prior to being approved to traverse the flight path.

In order to determine whether a flight path of a UAV violates a restricted region while accounting for the possibility that the UAV is not precisely on course, such as due to weather conditions, wind conditions, collision avoidance, difficult turns or changes in elevation between waypoints, or the like, the UAV may also provide tolerance parameter(s) (e.g., a set of uncertainty parameters). For example, the UAV may provide a radius and a center of a circle, or points and dimensions of an ellipsoid, that represent a worst-case expected deviation from a direct path between waypoints. An entity that receives the flight path and the tolerance parameters may generate an estimated path of the UAV by generating a three-dimensional (3D) shape between uncertainty circles or ellipses at each of the waypoints. Because this estimated path is based on a uniformly bounded worst-case expected deviation, the estimated path may be overly conservative for most actual UAV flights, resulting in rejection of flight paths for which the worst-case estimated flight path crosses into a restricted region, even if the likelihood of most UAVs actually crossing into the restricted region is relatively low. One technique to address this concern is to have the UAV send location data to an entity that is monitoring the UAV, but communicating location data may use significant battery power at the UAV and undesirably increase congestion in a wireless communication network.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a vehicle includes generating movement data based on traversing from a first location to a second location. The traversing is based on path information that indicates a plurality of waypoints designated to be traversed by the vehicle. The method further includes transmitting statistical information generated based on the movement data and the plurality of waypoints. The movement data is associated with an actual path of the vehicle. The plurality of waypoints are associated with an interpolated path of the vehicle.

In an additional aspect of the disclosure, a vehicle includes a memory storing processor-readable code, and at least one processor coupled to the memory. The at least one processor is configured to execute the processor-readable code to cause the at least one processor to generate movement data based on traversing from a first location to a second location. The traversing is based on path information that indicates a plurality of waypoints designated to be traversed by the vehicle. The at least one processor is further configured to execute the processor-readable code to cause the at least one processor to transmit statistical information generated based on the movement data and the plurality of waypoints. The movement data is associated with an actual path of the vehicle. The plurality of waypoints are associated with an interpolated path of the vehicle.

In an additional aspect of the disclosure, a method for wireless communication performed by a network entity receiving path information. The path information indicates a plurality of waypoints designated to be traversed by a vehicle. The method further includes receiving statistical information generated based on the movement data of the vehicle and the plurality of waypoints. The movement data is associated with an actual path of the vehicle. The plurality of waypoints are associated with an interpolated path of the vehicle.

In an additional aspect of the disclosure, a network entity includes a memory storing processor-readable code, and at least one processor. The at least one processor is configured to execute the processor-readable code to cause the at least one processor to receive path information. The path information indicates a plurality of waypoints designated to be traversed by a vehicle. The at least one processor is further configured to execute the processor-readable code to cause the at least one processor to receive statistical information generated based on movement data of the vehicle and the plurality of waypoints. The movement data is associated with an actual path of the vehicle. The plurality of waypoints are associated with an interpolated path of the vehicle.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram illustrating an example wireless communication system that supports vehicle path deviation reporting and updating according to one or more aspects.

FIG. 6 is a flow diagram illustrating an example process that supports vehicle path deviation reporting and updating according to one or more aspects.

FIG. 7 is a flow diagram illustrating an example process that supports vehicle path deviation reporting and updating according to one or more aspects.

Like reference numbers and designations in the various drawings indicate like elements.

DETAILED DESCRIPTION

Figure 1:
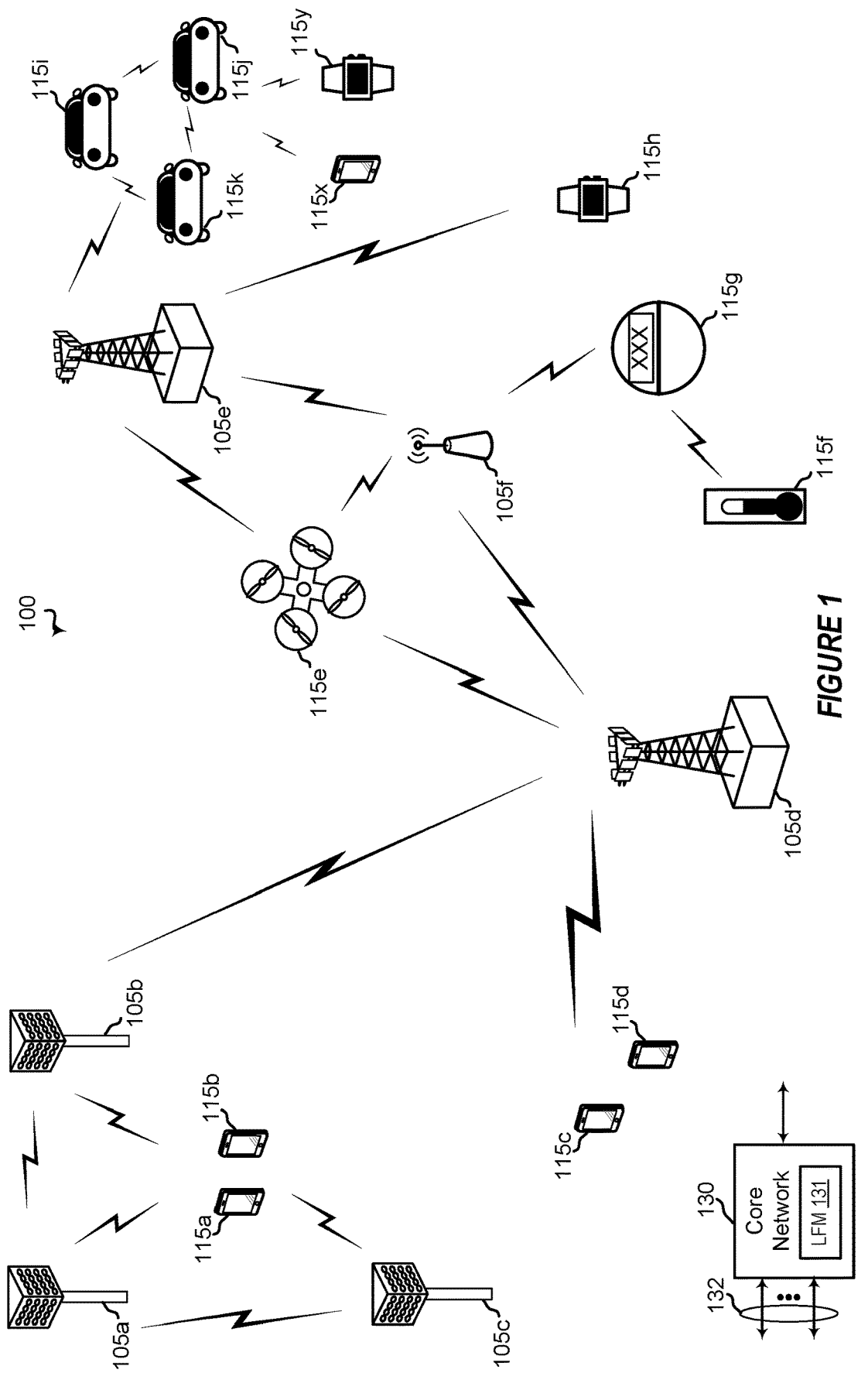
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support vehicle path deviation reporting and updating. For example, the present disclosure describes a vehicle, such as an unmanned aerial vehicle (UAV) or other autonomous or semi-autonomous vehicle, that is configured to provide statistical information to a network entity to enable a network to update or adjust a tolerance of an interpolated path of the vehicle during movement of the vehicle. To provide path deviation reporting, a vehicle may generate movement data based on traversing from a first location to a second location as part of a progression along a path indicated by path information. The path information may indicate a plurality of waypoints scheduled for traversal by the vehicle, and the first location and the second location may be along or nearby a path along the plurality of waypoints. To generate the statistical information, the vehicle may compare an actual path of the vehicle (e.g., from the first location to the second location) to an interpolated path of the vehicle (e.g., an interpolation of an expected traversal through the plurality of waypoints in a particular order), and the statistical information may include one or more statistics that represent a deviation between the actual path and the interpolated path. The interpolated path may be determined by performing a particular type of interpolation, such as linear interpolation, geodesic interpolation, spline-based interpolation, or another type, that is indicated by the network entity or determined by the vehicle based on information received from the network entity, and the one or more statistics may include a maximum deviation, a distribution of the deviation, a mean of the deviation, a standard deviation of the deviation, another statistic related to the deviation, or a combination thereof. Based on the statistical information, the network entity may update the interpolated path of the vehicle, such as by updating a tolerance associated with the interpolated path based on the statistical information. In this manner, the tolerance of an estimated path (e.g., the interpolated path) may be updated based on the actual path of the vehicle instead of a worst-case estimate that does not necessarily represent the actual path. The network entity may use the updated interpolated path to determine whether the vehicle will enter a restricted area, and based on the determination, the network entity may issue an alert or provide a termination command to the vehicle. In some implementations, the vehicle or the network entity may cause the vehicle to switch between operating in a statistics reporting mode to operating in a non-reporting mode to conserve power, such as when there are no nearby restricted areas or when there is less benefit to having a less conservative tolerance value.

Particular implementations of the subject matter described in this disclosure may be implemented to realize one or more of the following potential advantages or benefits. In some aspects, the present disclosure provides techniques for supporting vehicle path deviation reporting and updating. For example, the techniques described provide a framework for a vehicle, such as a UAV or other autonomous or semi-autonomous vehicle, to report statistical information associated with a deviation between an actual path and an interpolated path. The statistical information may be used by a network entity to update the interpolated path, such as by modifying a tolerance parameter associated with the interpolated path, based on the actual deviation of the vehicle instead of a worst-case estimated deviation. Because the tolerance parameter is modified based on the actual deviation, the interpolated path may be less conservative (e.g., the total volume covered by a three-dimensional (3D) space based on the interpolated path and the tolerance parameter) may be less than an estimated path (and space) determined based on a static worst-case tolerance. In this manner, a permissible area for vehicle travel may be increased as compared to using other path estimation techniques. Additionally, or alternatively, reporting the statistical information may include transmitting fewer and smaller messages than providing location data during movement of the vehicle, thereby reducing power consumption at the vehicle and congestion in the wireless network.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e. Additionally, V2V mesh network may include or correspond to a vehicle-to-everything (V2X) network between UEs 115i-115k and one or more other devices, such as UEs 115x, 115y.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example, the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
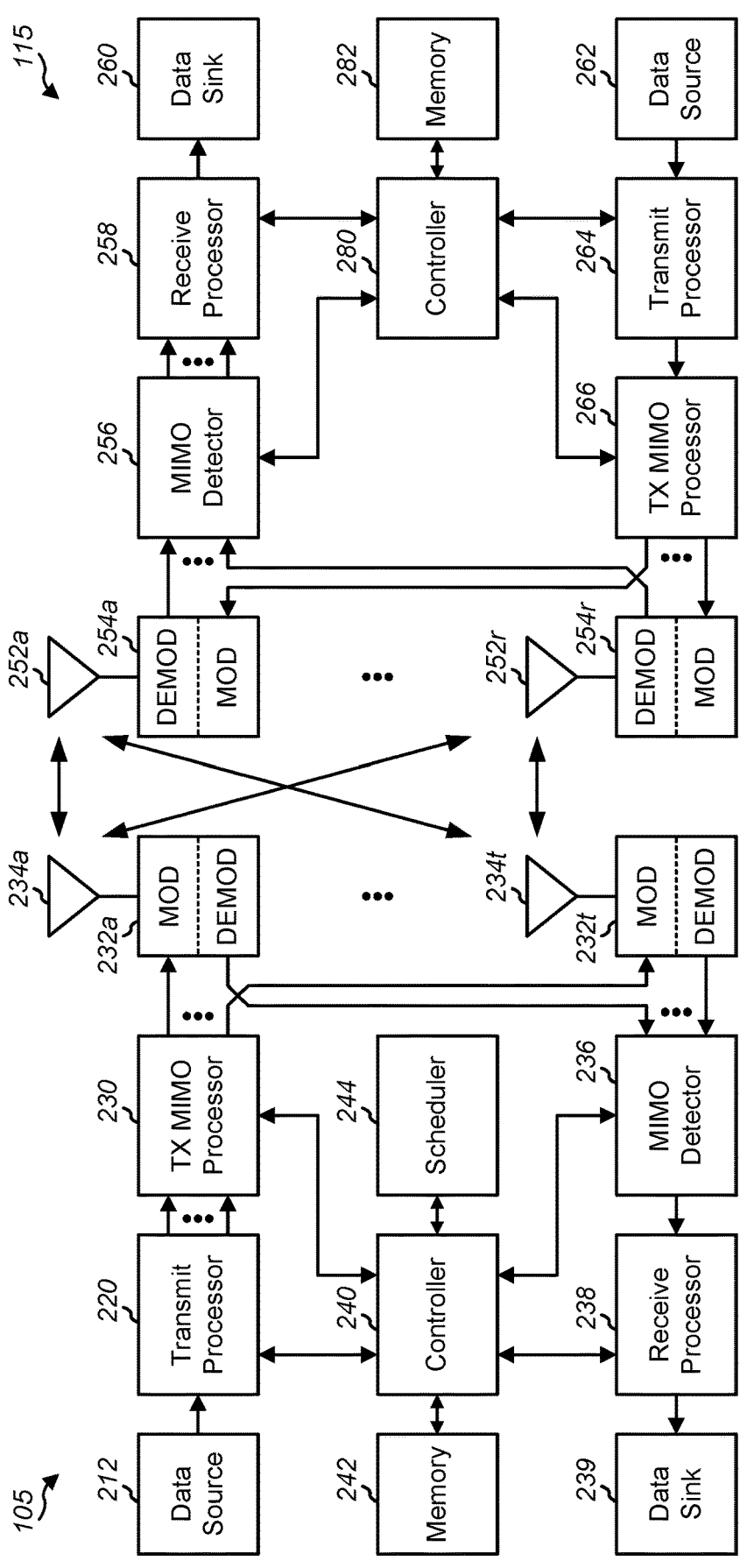
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in or described with reference to FIGS. 1-9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
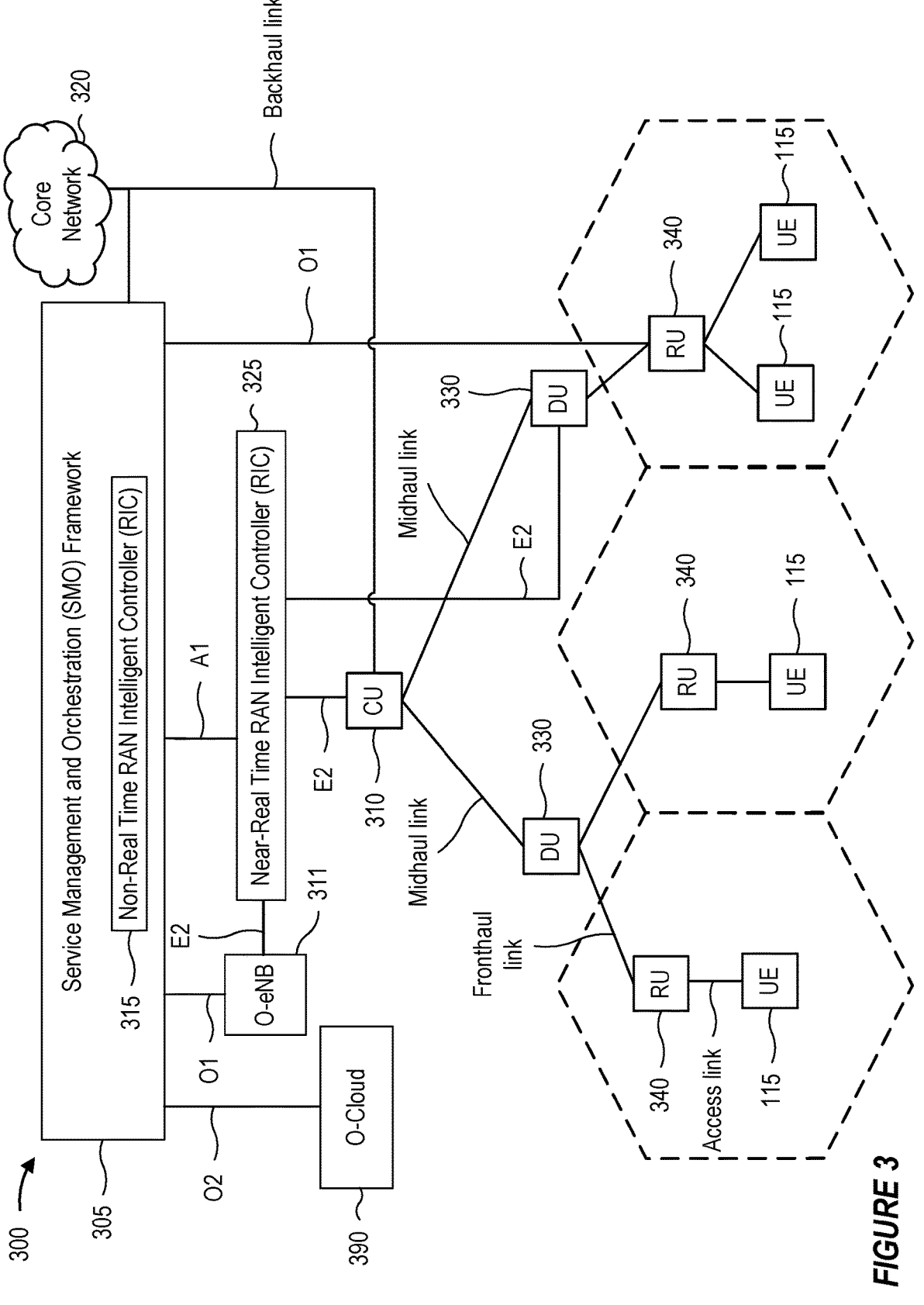
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RUs 340 can be implemented to handle over the air (OTA) communication with one or more UEs 115. In some implementations, real-time and non-real-time aspects of control and user plane communication with the RUs 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUS 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, a server, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

FIG. 4 is a block diagram of an example wireless communications system 400 that supports vehicle path deviation reporting and updating according to one or more aspects. In some examples, wireless communications system 400 may implement aspects of wireless network 100. Wireless communications system 400 includes UE 115, a vehicle 401, and a network entity 450. In some implementations, vehicle 401 may include or correspond to UEs 115c. 115i, 115j, 115k of FIG. 1. In some implementations, vehicle 401 and UE 115 may be individually or collectively referred to as a vehicle system. Although one UE 115, one vehicle 401, and one network entity 450 are illustrated in FIG. 4, in some other implementations, wireless communications system 400 may generally include multiple UEs 115, multiple vehicles 401, multiple network entities 450, or a combination thereof.

In some implementations, UE 115, network entity 450, and vehicle 401 may be positioned within a common geographic area. In other implementations, UE 115 may be in a different geographic area than network entity 450 and vehicle 401. In some implementations, UE 115, vehicle 401, or both, are mobile devices. Network entity 450 may include a base station, such as base station 105 of FIGS. 1-3, an access point (AP), a roadside unit (RSU), another UE or vehicle, or part of a core network, such as core network 130 of FIG. 1. Network entity 450 may be stationary or mobile.

Vehicle 401 may include a device, such as a mobile device or a vehicle. For example, vehicle 401 may include or correspond to UEs 115c, 115i, 115j, 115k of FIG. 1. As illustrative examples, vehicle 401 may include a UAV or drone aircraft, such as drone 115c of FIG. 1, a self-driving car or assisted-driving car, or any other type of autonomous or semi-autonomous land craft, watercraft, aircraft, or combination thereof. Although examples are described herein in the context of a UAV, such examples are illustrative and are not intended to limit vehicle 401 to any particular type of vehicle. Vehicle 401 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). In some implementations, vehicle 401 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280 of FIG. 2, and memory 404 includes or corresponds to memory 282 of FIG. 2.

Memory 404 includes or is configured to store instructions 405, movement data 406, path data 408, location information 410, distance 412, and one or more thresholds 414 (hereinafter referred to collectively as "thresholds 414"). Instructions 405 may include processor-readable code, program code, one or more software instructions, or the like, as illustrative, non-limiting examples. Movement data 406 represents movement of vehicle 401 over time, such as location data at various times during a trip, changes in location of vehicle 401, orientation of vehicle 401, velocity of vehicle 401, or a combination thereof. Path data 408 represents a path scheduled for traversal by vehicle 401. For example, path data 408 may indicate a plurality of waypoints, and optionally arrival times associated with the waypoints, during a proposed or scheduled trip by vehicle 401. In implementations in which vehicle 401 is a UAV, the plurality of waypoints may make up a flight path for the UAV that, once approved, the UAV will travel along during a flight. Location information 410 represents locations of vehicle 401 at various times. For example, location information 410 may include or be based on GPS data, GNSS data, position data, or the like. Distance 412 represents a distance between vehicle 401 and a preconfigured region, such as a restricted area or a no-fly zone. Thresholds 414 include one or more thresholds used to perform operations of vehicle 401, such as distance thresholds, deviation thresholds, threshold amounts of time, other thresholds, or a combination thereof.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, network entity 450, UE 115, or another vehicle 401. In some implementations, transmitter 416 and receiver 418 may be integrated in one or more transceivers. Additionally, or alternatively, transmitter 416 or receiver 418 may include or correspond to one or more components of UE 115 described with reference to FIG. 2.

In some implementations, vehicle 401 may include one or more antenna arrays. The one or more antenna arrays may be coupled to transmitter 416, receiver 418, or a communication interface. An antenna array may include multiple antenna elements configured to perform wireless communications with other devices, such as with network entity 450 or UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of vehicle 401. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Vehicle 401 may include one or more components as described herein with reference to UE 115 of FIGS. 1-3. In some implementations, vehicle 401 is a 5G-capable vehicle, a 6G-capable vehicle, or a combination thereof.

UE 115 may include a device, such as a mobile device or a stationary device. In some implementations, UE 115 is a device that is configured to communicate with vehicle 401, network entity 450, or both. In some implementations, UE 115 is configured to control or partially control operations of vehicle 401. UE 115 may include a variety of components (such as structural, hardware components) used for carrying out one or more functions described herein. For example, these components may include one or more processors, one or more memory devices, one or more transmitters, one or more receivers, and optionally an antenna array, as described above with reference to vehicle 401. In some implementations, UE 115 may include an interface (e.g., a communication interface) that includes a transmitter, a receiver, or a combination thereof. The one or more processors may be configured to execute instructions stored in the one or more memory devices to perform the operations described herein. In some implementations, the one or more processors include or correspond to one or more of receive processor 258, transmit processor 264, and controller 280 of FIG. 2, and the one or more memory devices include or correspond to memory 282 of FIG. 2.

UE 115 may include one or more components as described herein with reference to UE 115 of FIGS. 1-3. In some implementations, UE 115 is a 5G-capable UE, a 6G-capable UE, or a combination thereof.

Network entity 450 may include a device, such as a base station, a roadside unit (RSU), a node, a part of a core network, a server, or another network device. Network entity 450 may be a mobile device or a stationary device. Network entity 450 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, network entity 450 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242 of FIG. 2.

Memory 454 includes or is configured to store instructions 460, path data 408, interpolation indicator 462, updated interpolated path 464, location information 466, and one or more thresholds 468 (hereinafter referred to collectively as "thresholds 468"). Instructions 460 may include processor-readable code, program code, one or more software instructions, or the like, as illustrative, non-limiting examples. Path data 408 represents a path scheduled for traversal by vehicle 401, as described above. Interpolation indicator 462 indicates a type of interpolation (e.g., an interpolation type) to be performed by network entity 450 in order to determine the interpolated path of vehicle 401. As non-limiting examples, the interpolation type may be linear interpolation, geodesic interpolation, spline-based interpolation, or another type of interpolation. Updated interpolated path 464 represents an interpolated path of vehicle 401 that is updated based on statistics reported by vehicle 401. For example, network entity 450 may determine an interpolated path of vehicle 401 based on the waypoints indicated by path data 408, and the interpolated path may be associated with an interpolation type that is indicated by interpolation indicator 462. In this example, the network entity 450 may update or modify a tolerance parameter, also referred to as an uncertainty parameter, based on a deviation between an actual path of vehicle 401 and the interpolated path as indicated by the reported statistics, as further described herein. Location information 466 represents locations of one or more preconfigured regions, such as a restricted area or a no-fly zone. For example, location information 466 may include or be based on GPS data, GNASS data, position data, or the like. Thresholds 468 include one or more thresholds used to perform operations of network entity 450, such as distance thresholds, deviation thresholds, threshold amounts of time, other thresholds, or a combination thereof.

Transmitter 456 is configured to transmit reference signals, control information and data to one or more other devices, and receiver 458 is configured to receive references signals, synchronization signals, control information and data from one or more other devices. For example, transmitter 456 may transmit signaling, control information and data to, and receiver 458 may receive signaling, control information and data from, vehicle 401, UE 115, or another network entity 450. In some implementations, transmitter 456 and receiver 458 may be integrated in one or more transceivers. Additionally, or alternatively, transmitter 456 or receiver 458 may include or correspond to one or more components of base station 105 described with reference to FIG. 2.

In some implementations, network entity 450 may include one or more antenna arrays. The one or more antenna arrays may be coupled to transmitter 456, receiver 458, or a communication interface. An antenna array may include multiple antenna elements configured to perform wireless communications with other devices, such as with vehicle 401 or UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of network entity 450. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Network entity 450 may include one or more components as described herein with reference to base station 105 of FIGS. 1-3. In some implementations, network entity 450 is a 5G-capable network entity, a 6G-capable network entity, or a combination thereof.

In some implementations, wireless communications system 400 implements a 5G NR network. For example, wireless communications system 400 may include multiple 5G-capable UEs 115, multiple 5G-capable vehicles 401, or multiple 5G capable network entities 450, such as UEs, vehicles, and base stations configured to operate in accordance with a 5G NR network protocol such as that defined by the 3GPP. In some other implementations, wireless communications system 400 implements a 6G network.

During operation of wireless communications system 400, vehicle 401 may be scheduled to traverse a path indicated by path data 408. For example, path data 408 may include or indicate a plurality of waypoints that are scheduled or designated to be traversed by vehicle 401 during a particular trip. In implementations in which vehicle 401 is a UAV or drone aircraft, path data 408 (and the plurality of waypoints) may correspond to a flight path. In other implementations, path data 408 may represent a path to be traversed over land (e.g., by a land craft), a path to be traversed over water (e.g., by a watercraft), a path to be traversed through the air (e.g., by an aircraft), or a combination thereof (e.g., via a hybrid craft). Path data 408 may optionally indicate a plurality of times (e.g., estimated timestamps) that correspond to the plurality of waypoints. For example, each waypoint in path data 408 may be associated with an expected arrival or traversal time by vehicle 401 during the particular trip. In some implementations, vehicle 401 generates path data 408 and transmits path data 408 to network entity 450. Alternatively, UE 115 may generate path data 408, such as based on user input from a user of UE 115 that controls at least some operations of vehicle 401, and UE 115 may transmit path data 408 to vehicle 401 and network entity 450.

The path indicated by path data 408 may be approved by network entity 450 (or another device within a network that includes network entity 450) or by an authority, such as a regulatory agency, a government agency, an industry group, one or more owners of property included in the path, another entity, or a combination thereof. For example, network entity 450 may apply a particular type of interpolation to the waypoints indicated by path data 408 to determine an interpolated path. To further illustrate, network entity 450 may determine segments or other connecting portions between each pair of waypoints, in order, indicated by path data 408 by performing one or more interpolation operations, such as linear interpolation operations as a non-limiting example. The interpolated path may represent a 3D space formed by creating a shape, such as a circle, ellipse, polygon, or other shape, that is based on a tolerance parameter at each of the waypoints and connecting the shapes to form the space. As an example, if a tolerance parameter corresponds to a center and radius of a circle that represents estimated deviations of vehicle 401 and path data 408 indicates four waypoints, network entity 450 may generate a circle around each of the four waypoints and connect the circles via a shape having a circular cross section and that extends along the interpolated segments between each pair of waypoints in path order. For example, the shape may correspond to a cylinder that extends from one waypoint to another waypoint, and vehicle 401 is expected to be within that cylinder as it traverses between the two waypoints. In other examples, other shapes may be formed based on the tolerance parameter and used to generate the interpolated path. The type of interpolation used to determine the interpolated path may be indicated by interpolation indicator 462. As non-limiting examples, the interpolation type may be linear interpolation, geodesic interpolation, spline-based interpolation, or another type of interpolation.

Network entity 450 may use an initial or default value of the tolerance parameter that is provided by vehicle 401 or UE 115 in order to determine the interpolated path, and this default value of the tolerance parameter may be smaller (e.g., less conservative) than a worst-case tolerance parameter used in other path estimation techniques, such as tolerance (e.g., uncertain) parameters specified in a wireless communication standard such as Technical Report (TR) 37.355 for Release 15 promulgated by the 3GPP. Alternatively, network entity 450 may determine the interpolated path by treating vehicle 401 as a point along the interpolated segments between the waypoints, and the tolerance parameter and shape approach described above may be used during movement of vehicle 401 as vehicle 401 provides additional data. After the interpolated path is determined, network entity 450 may approve vehicle 401 for travel based on the interpolated path. For example, network entity 450 may compare the interpolated path to location information 466 that represents locations of one or more preconfigured regions that vehicle 401 is not permitted to enter. For example, the preconfigured regions may be a military installation, a government location, a classified area, a privately-owned area that has been designated off-limits to vehicles including UAVs, or the like, and the regions may be indicated by GPS coordinates, positioning data, geo-fences, or other types of location information. If the interpolated path does not cross into any of the one or more preconfigured regions indicated by location information 466 (e.g., if the tolerance cylinder or other shape does not breach a 3D region indicated by location information 466), network entity 450 may approve vehicle 401 for travel along the path, and network entity 450 may provide an approval indicator to vehicle 401, UE 115, or both. If the interpolated path intersects or crosses into any of the preconfigured regions, network entity 450 may reject vehicle 401 for travel along the path by sending a rejection indicator to vehicle 401, UE 115, or both. Alternatively, other metrics or comparisons may be performed by network entity 450 to reject or approve vehicle 401 for travel along the path indicated by path data 408. Although described above as network entity 450 approving the path, in some other implementations, network entity 450 may provide information to an agency, and the agency may approve or reject vehicle 401 to travel along the path indicated by path data 408. For example, network entity 450 may provide path data 408, the interpolated path, location information 466, or a combination thereof, to the agency, and the agency may approve or reject vehicle 401 to travel along the path based on the provided information. The agency may provide an approval or rejection indicator directly to vehicle 401 or UE 115, or the agency may provide the indicator(s) to network entity 450 for communication to vehicle 401 or UE 115.

If vehicle 401 is approved to travel along the path, vehicle 401 may begin traversing to a first waypoint (and then to others) indicated by path data 408. As vehicle 401 travels, it may generate movement data 406 that indicates the movement of vehicle 401. For example, vehicle 401 may generate movement data 406 based on traversing from a first location, such as a starting point, to a second location, such as a location along or near the interpolated path. Movement data 406 may be used to determine an actual path of vehicle 401, as compared to the interpolated path. For example, vehicle 401 may determine the actual path by connecting consecutive locations indicated by movement data using segments or other connectors to determine the actual path traversed by vehicle 401. During some trips, the actual path may deviate from the interpolated path, such as due to wind or weather conditions causing vehicle 401 to deviate from the interpolated path or due to the presence of obstacles or other vehicle in the interpolated path, as non-limiting examples. Because different trips by vehicle 401 may be associated with different deviations, the deviation between the actual path and the interpolated path may vary even if vehicle 401 attempts to traverse along the same path at different times. Thus, determining a tolerance parameter of vehicle 401 for a particular trip during windy conditions may be overly conservative for a tolerance parameter of vehicle 401 for a particular trip during windy and uncrowded conditions.

To enable network entity 450 (or an agency) to adjust the interpolated path based on deviations of vehicle 401 during a particular trip (instead of worst-case uniform assumptions), vehicle 401 may generate and transmit statistical information 470 to network entity 450. Vehicle 401 may generate statistical information 470 based on movement data 406 and the plurality of waypoints indicated by path data 408, and statistical information 470 may indicate, be associated with, or be based on a deviation between the actual path (e.g., based on movement data 406) and the interpolated path. For example, vehicle 401 may compare an actual path indicated by or derived from movement data 406 to an interpolated path that is generated based on path data 408, and vehicle 401 may generate statistical information 470 to represent the deviation resulting from the comparison. Statistical information 470 may include or indicate one or more statistics associated with the deviation between the actual path (e.g., one or more points along the actual path) and the interpolated path (e.g., one or more corresponding points along the interpolated path). For example, the statistics may include a maximum value, a distribution, an average (e.g., a mean), a standard deviation, one or more other statistical values, or a combination thereof. To further illustrate, in one example, the statistical information 470 may include a maximum value of the deviation between the actual path, or a portion thereof, and the interpolated path, or a corresponding portion thereof. As another example, the statistical information 470 may include a distribution (e.g., a statistical distribution) of the deviation between the actual path, or a portion thereof, and the interpolated path, or a corresponding portion thereof. As yet another example, the statistical information 470 may include an average (e.g., mean) or weighted average of the deviation between the actual path, or a portion thereof, and the interpolated path, or a corresponding portion thereof. As still another example, the statistical information 470 may include a standard deviation computed from the deviation between the actual path, or a portion thereof, and the interpolated path, or a corresponding portion thereof.

To determine the interpolated path, vehicle 401 may apply a particular type of interpolation to the waypoints indicated by path data 408. For example, vehicle 401 may determine segments or other connecting portions between each pair of waypoints, in order, indicated by path data 408 by performing one or more interpolation operations, such as linear interpolation operations as a non-limiting example. In some implementations, network entity 450 may transmit interpolation indicator 462 to vehicle 401 to inform vehicle 401 of a type of interpolation to perform. In some other implementations, vehicle 401 may determine the type of interpolation to perform based on information from network entity 450, such as broadcast information indicating preferred interpolated path types, an identifier or other identification information associated with network entity 450, a device type associated with network entity 450, other information or characteristics of network entity 450, or the like. As explained above, the interpolation type may include or correspond to linear interpolation, geodesic interpolation, spline-based interpolation, or another type of interpolation.

In some implementations, vehicle 401 may periodically transmit statistical information 470 to network entity 450 according to a preconfigured periodicity. For example, vehicle 401 may be preprogrammed with a preconfigured periodicity parameter value, or network entity 450 may communicate a requested periodicity parameter value. In some implementations, the preconfigured periodicity may be indicated by a wireless communication standard. In some other implementations, vehicle 401 may transmit statistical information 470 at other times, such as when vehicle 401 traverses the waypoints indicated by path data 408 or when buffered statistical information reaches a threshold amount. Additionally or alternatively, vehicle 401 may provide statistical information 470 in response to receiving one or more requests from network entity 450. The communication scheme for statistical information 470 may be selected to reduce or minimize power consumption at vehicles 401, which may be associated with less battery reserves than other types of UEs or fixed network devices and to reduce communication overhead and congestion in wireless communications system 400. Alternatively, if power consumption and network congestion are less important, the communication scheme can be selected to increase the frequency of transmission of statistical information 470 to enable faster updating at network entity 450.

Network entity 450 may receive statistical information 470 and update the interpolated path (e.g., generate or determine updated interpolated path 464) based on statistical information 470. For example, network entity 450 may update a tolerance parameter (e.g., an uncertainty parameter) associated with the interpolated path based on statistical information 470 to generate updated interpolated path 464. To further illustrate, statistical information 470 may include or indicate one or more statistics based on the deviation between the actual path of vehicle 401 and the interpolated path of vehicle 401, and network entity 450 may modify or update the tolerance parameter to have a value equal to, based on, or derived from one or more of the statistics indicated by statistical information 470. For example, network entity 450 may increase or decrease a radius of an uncertainty circle based on statistical information 470, such as by decreasing a radius from an initial value to a value that corresponds to a maximum deviation indicated by statistical information 470, and updated interpolated path 464 may include a cylinder from the next waypoint through the remaining waypoints that has the updated radius. As explained above, other shapes and dimensions may be used to indicate the tolerance associated with the position of vehicle 401 along updated interpolated path 464. In some implementations, network entity 450 may continue to modify updated interpolated path 464 throughout the movement of vehicle 401. For example, for a second portion of the path between a second waypoint and a third waypoint, network entity 450 may generate updated interpolated path 464 based on statistical information 470 that corresponds to a first portion of the path between a first waypoint and a second waypoint. In this example, for a third portion of the path between the third waypoint and a fourth waypoint, network entity 450 may update updated interpolated path 464 based on statistical information 470 corresponding to the second portion of the path or based on a combination of statistical information 470 that corresponds to the first portion and the second portion. In this manner, updated interpolated path 464 may be updated based on deviation of the actual path from the interpolated path for the current trip, or deviation of the actual path from the interpolated path for a most recently traveled portion of the path, which may be more representative of the deviation than a static, predetermined value that is not based on the current trip or a most recent part of the current trip.

After updating updated interpolated path 464, network entity 450 may compare updated interpolated path 464 to location information 466 to determine if updated interpolated path 464 violates one or more preconfigured regions indicated by location information 466. The preconfigured regions that may be associated with a particular location, a particular device, a particular structure, a particular geofence, other boundaries, or a combination thereof. For example, location information 466 may include coordinates of a geofence that represents a region that is designated as private property or as restricted to vehicle traffic. As another example, location information 466 may include GPS coordinates or other positioning data indicating a hazard or an obstacle to vehicle 401, or a potential safety concern to others if vehicle 401 is present. If network entity 450 determines that updated interpolated path 464 intersects with a preconfigured region, or is within a threshold distance (e.g., of thresholds 468) of a particular location, network entity 450 may determine that updated interpolated path 464 no longer complies with one or more requirements, resulting in detection of an alert condition. Responsive to detecting the alert condition, network entity 450 may transmit alert 474 to one or more devices. The one or more devices include a server, a UE, another network entity, a third party system, an agency, another device or system, or a combination thereof. For example, network entity 450 may transmit alert 474 to vehicle 401, UE 115, a regulatory agency, an entity associated with the preconfigured region, the network, or the like. Although described above as network entity 450 detecting the alert condition, in some other implementations, network entity 450 may transmit updated interpolated path 464 to an agency (e.g., an authority), and the agency may detect whether an alert condition is present. The agency may transmit alert 474 in response to detecting the alert condition, or the agency may provide an indication of a detected alert to network entity 450, and network entity 450 may transmit alert 474 based on receiving the indicator. In some optional implementations, network entity 450 may transmit a command to stop movement of vehicle 401. For example, network entity 450 may transmit termination command 476 to vehicle 401 based on updated interpolated path 464 intersecting with a preconfigured region indicated by location information 466. Vehicle 401 may receive termination command 476 and stop travelling, optionally transitioning to a standby mode, an error mode, or a low power mode, and reporting the condition to UE 115.

In some implementations, vehicle 401 may be configured to operate in multiple operating modes, including a statistics reporting mode associated with sharing statistical information 470 and a static tolerance mode associated with maintaining a tolerance parameter associated with interpolated paths of vehicle 401. The statistics reporting mode may also be referred to as an error reporting mode, a path deviation reporting mode, a statistical information reporting mode, or a reporting mode, and the static tolerance mode may also be referred to as a uniform tolerance mode, a uniform uncertainty mode, a default operating mode, or a non-reporting mode. Network entity 450 may instruct vehicle 401 to switch between these operating modes, or vehicle 401 may be configured to transition between these operating based on determination(s) at vehicle 401. In some implementations, vehicle 401 may operate in the static tolerance mode initially (e.g., by default), and may switch to the statistics reporting mode based on request by network entity 450. In some other implementations, vehicle 401 may operate in the statistics reporting mode initially (e.g., by default), and may switch to the static tolerance mode based on request by network entity 450. In an example in which vehicle is operating in the static tolerance mode, network entity 450 may provide signaling to vehicle 401 to control the operating mode of vehicle 401. For example, network entity 450 may transmit mode change request message 472 to vehicle 401 to cause a mode change at vehicle 401. In this example, vehicle 401 receives mode change request message 472 and transitions from the static tolerance mode to the statistics reporting mode based on receipt of mode change request message 472. While operating in the statistics reporting mode, vehicle 401 may transmit statistical information 470 to network entity 450, such as based on a preconfigured periodicity, based on request, based on other conditions, or in other manners, as described above. Network entity 450 may transmit mode change request message 472 to cause vehicle 401 to transition to the statistics reporting mode based on vehicle 401 being on a portion of updated interpolated path 464 (or an initial interpolated path) that is within a threshold distance (e.g., of thresholds 468) of a region indicated by location information 466, based on vehicle 401 being on a portion of updated interpolated path 464 that is before one or more nearby regions indicated by location information 466, or based on other considerations. In this example, network entity 450 may determine at a later time that vehicle 401 is to return to the static tolerance mode, such as based on a determination that vehicle 401 has passed all nearby regions indicated by location information 466 or that updated interpolated path 464 is greater than a threshold distance from all such regions, and network entity 450 may transmit a second mode change request message (not shown in FIG. 4 for convenience) based on this determination, or other consideration. Vehicle 401 may receive the second mode change request message and transition from the statistics reporting mode to the static tolerance mode based on receipt of the second mode change request message.

In some implementations, vehicle 401 may initiate a transition between the statistics reporting mode and the static tolerance mode, or vice versa. For example, vehicle 401 may transition from the statistics reporting mode to the static tolerance mode based on distance 412 between vehicle 401 and a preconfigured region indicated by location information 410 being less than a threshold distance of thresholds 414. In this example, transitioning to the statistics reporting mode when distance 412 is within the threshold distance to a prohibited region may enable network entity 450 to generate updated interpolation path 464 based on statistical information 470, instead of based on a static value, which may result in vehicle 401 being permitted to continue traveling if the deviation between the actual path and the interpolated path is not sufficiently large that there is a danger of vehicle 401 crossing into the prohibited region. Additionally or alternatively, vehicle 401 may transition from the statistics reporting mode to the static tolerance mode based on distance 412 between vehicle 401 and a nearest region indicated by location information 410 being greater than a threshold distance (of thresholds 414).

As described with reference to FIG. 4, the present disclosure provides techniques for supporting vehicle path deviation reporting and updating. The techniques described provide a framework for vehicle 401 (e.g., a UAV or other autonomous or semi-autonomous vehicle), to report statistical information 470 associated with a deviation between an actual path of vehicle 401 and an interpolated path of vehicle 401. Statistical information 470 may be used by network entity 450 to generate updated interpolated path 464, such as by modifying a tolerance parameter associated with the interpolated path, based on the actual deviation of vehicle 401 instead of a worst-case estimated deviation. Because updated interpolated path 464 (e.g., the tolerance parameter) is modified based on the actual deviation (e.g., derived from statistical information 470), updated interpolated path 464 may be less conservative (e.g., the total volume covered by a 3D space based on updated interpolated path 464) may be less than an estimated path (and space) determined based on a static worst-case tolerance. In this manner, a permissible area for vehicle 401 to travel may be increased as compared to using other path estimation techniques. Additionally, or alternatively, reporting statistical information 470 may include transmitting fewer and smaller messages between vehicle 401 and network entity 450 than providing location data during movement of vehicle 401, thereby reducing power consumption at vehicle 401 and congestion in wireless communications system 400.

Figure 5:
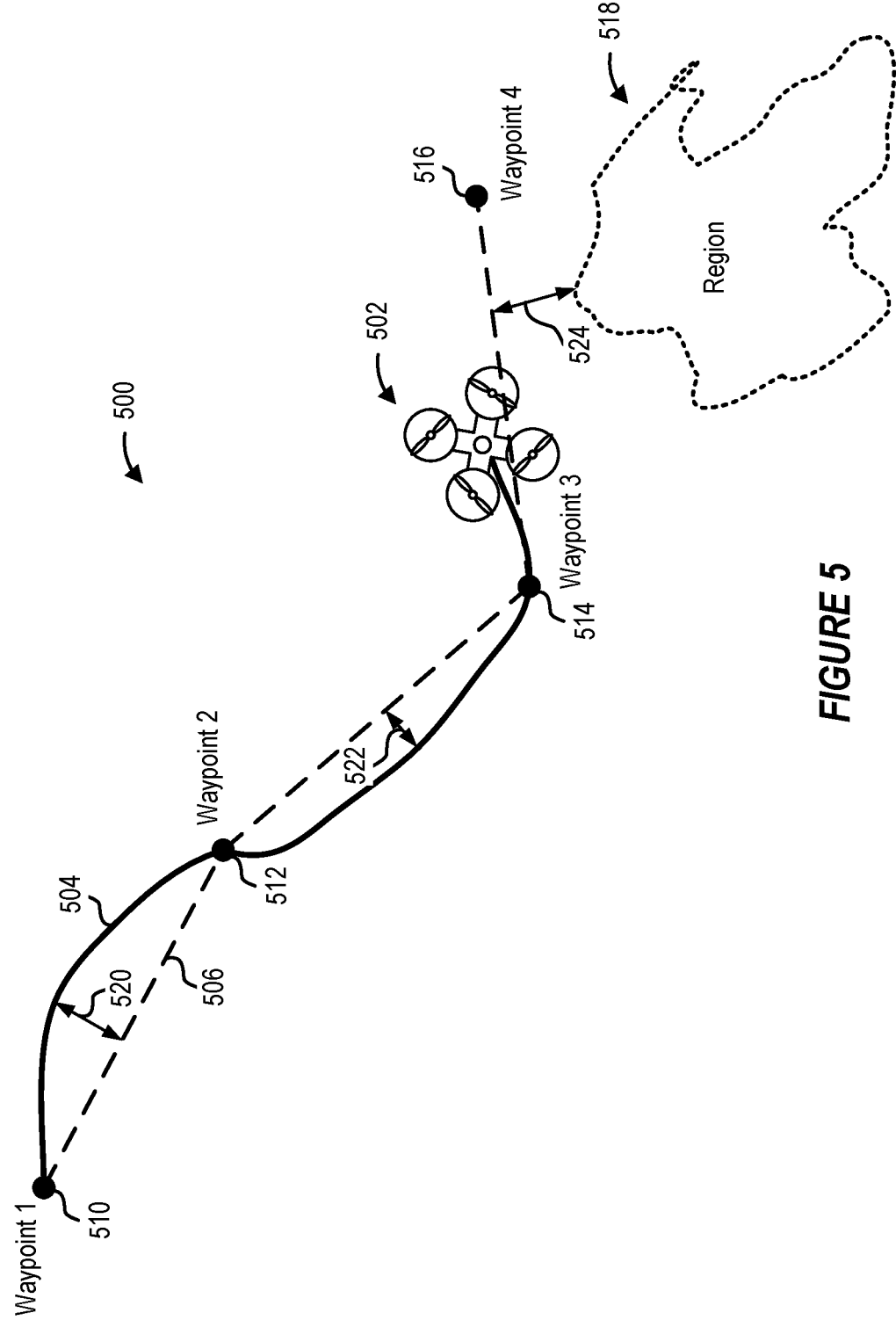
FIG. 5 is a diagram illustrating an example of vehicle path deviation reporting according to one or more aspects.

FIG. 5 is a diagram illustrating an example of vehicle path deviation reporting according to one or more aspects. The example shown in FIG. 5 illustrates a flight path scheduled to be traversed during a trip within an area 500 by vehicle 502, which may be a UAV in this example. In other examples, vehicle 502 may be a different type of autonomous or semi-autonomous vehicle. FIG. 5 shows an actual path 504 and an interpolated path 506 corresponding to the trip by vehicle 502. Prior to the trip, vehicle 502, or a UE that controls vehicle 502, may provide path data (e.g., path data 408 of FIG. 4) that includes a plurality of waypoints scheduled for traversal by vehicle 502 during the trip. For example, the plurality of waypoints may include a first waypoint 510 ("Waypoint 1"), a second waypoint 512 ("Waypoint 2"), a third waypoint 514 ("Waypoint 3"), and a fourth waypoint 516 ("Waypoint 4"). Although four waypoints are shown in FIG. 5, in other examples, the flight path of vehicle 502 may include fewer than four or more than four waypoints.

Actual path 504 represents a path actually traversed by vehicle 502 during the trip, and interpolated path 506 represents an estimated path to be traversed by vehicle 502 during the trip. For example, a network entity or an authority may determine interpolated path 506 based on the waypoints 510-516 by applying a particular type of interpolation to determine portions of interpolated path between each pair of consecutive waypoints. The type of interpolation may be linear interpolation, geodesic interpolation, spline-based interpolation, or another type of interpolation. For example, a first portion of interpolated path 506 may connect first waypoint 510 to second waypoint 512, a second portion of interpolated path 506 may connect second waypoint 512 to third waypoint 514, and a third portion of interpolated path 506 may connect third waypoint 514 to fourth waypoint 516. Actual path 504 represents the path actually traversed by vehicle 502, which may be different than interpolated path 506 due obstacles or terrain in area 500, due to a type of interpolation associated with interpolated path 506 being different than parameter(s) used by vehicle 502 to determine a path to traverse waypoints 510-516, due to wind or weather conditions that prevent vehicle 502 from remaining on interpolated path 506, other reasons, or a combination thereof. Although in the example shown in FIG. 5, actual path 504 includes each of waypoints 510-516, in other examples, actual path 504 may not include one or more waypoints. For example, vehicle 502 may traverse within a particular distance of each of the waypoints, according to rules or requirements of vehicle travel, or vehicle 502 may miss one or more waypoints if missing waypoints is permitted by such rules or requirements. Additionally, or alternatively, the path data that indicates waypoints 510-516 may also include estimated arrival times (e.g., timestamps) by vehicle 502 at each of the waypoints. For example, a first estimated arrival time may be associated with first waypoint 510 and indicate an estimated or planned arrival time at first waypoint 510, a second estimated arrival time may be associated with second waypoint 512 and indicate an estimated or planned arrival time at second waypoint 512, a third estimated arrival time may be associated with third waypoint 514 and indicate an estimated or planned arrival time at third waypoint 514, and a fourth estimated arrival time may be associated with fourth waypoint 516 and indicate an estimated or planned arrival time at fourth waypoint 516.

During the trip, vehicle 502 may provide statistical information to a network entity, such as a base station, a RSU, or another network entity, and the statistical information may indicate or represent a deviation between actual path 504 and interpolated path 506. In some implementations, the statistical information may include or correspond to statistical information 470 of FIG. 4. For example, after traversing past second waypoint 512, vehicle 502 may transmit first statistical information that indicates a first deviation 520 of a first portion of actual path 504 (e.g., from first waypoint 510 to second waypoint 512) from the first portion of interpolated path 506 (e.g., from first waypoint 510 to second waypoint 512). In the example shown in FIG. 5, first deviation 520 is a maximum deviation between the first portion of actual path 504 and the first portion of interpolated path 506. In other implementations, first deviation 520 may be an average deviation over the first portions, a median deviation over the first portions, a mode of a deviation over the first portions, a standard deviation of the deviation over the first portions, a distribution of the deviation over the first portions, or any other type of deviation-related statistic. As another example, after traversing past third waypoint 514, vehicle 502 may transmit second statistical information that indicates a second deviation 522 (e.g., a maximum deviation) of a second portion of actual path 504 (e.g., from second waypoint 512 to third waypoint 514) from the second portion of interpolated path 506 (e.g., from second waypoint 512 to third waypoint 514). Vehicle 502 may be configured to always provide statistical information or to provide statistical information when operating in a statistics reporting mode, which may be triggered by the network entity or vehicle 502, as described above with reference to FIG. 4.

The network entity may determine an updated interpolated path by adjusting a tolerance parameter (e.g., an uncertainty parameter) of interpolated path 506 based on the received statistical information. For example, at a time after vehicle 502 transmits the first statistical information, the network entity may update or modify (e.g., adjust) a tolerance parameter from an initial value to a value that is equal to, based on, or derived from first deviation 520 indicated by the first statistical information. To illustrate, the network entity may modify the tolerance parameter from having an initial worst-case uniform value to having a value based on first deviation 520. As another example, at a time after vehicle 502 transmits the second statistical information, the network entity may update or modify the tolerance parameter from the value based on the first deviation 520 to a value based on the second deviation 522. In some implementations, the network entity may update the tolerance parameter each time new statistical information is received. In some other implementations, the network entity may update the tolerance parameter if the new statistical information indicates a deviation that exceeds the value of the tolerance parameter. In some other implementations, the network entity may update the tolerance parameter based on an aggregation of received statistical information, such as based on an average deviation, a weighted average, or another value based on or derived from received statistical information that corresponds to different portions of actual path 504 and interpolated path 506. After updating the tolerance parameter, interpolated path 506 may be updated by changing a dimension of interpolated path 506 or of a shape (e.g., a circle, an ellipse, a polygon, etc.) that is centered around interpolated path 506 and that represents a tolerance or uncertainty associated with vehicle 502. For example, a tolerance circle (e.g., an uncertainty circle) associated with interpolated path 506 may have a radius that is equal to an initial worst-case value, the radius of the tolerance circle may be equal to or based on first deviation 520 after the first statistical information is received and processed, and, the radius of the tolerance circle may be equal to or based on second deviation 522 after the second statistical information is received and processed.

After updating interpolated path 506, the network entity may determine whether an alert condition is detected. For example, if area 500 includes a restricted region 518, such as private property, a restricted airspace, a no-fly region, or the like, the network entity may determine if the updated interpolated path 506 intersects with (e.g., crosses into) region 518 to detect an alert condition. To illustrate, if there is a distance 524 between interpolated path 506 (without application of the tolerance parameter) and region 518, then an alert condition may be detected if the tolerance parameter has a value that is equal to or exceeds distance 524. Stated another way, if an uncertainty region around interpolated path 506 reaches farther than distance 524, it is possible that vehicle 502 will enter region 518, and an alert condition is detected. If the network detects the alert condition, the network entity may transmit an alert, a termination instruction, or both, as described above with reference to FIG. 4. Because the example described with reference to FIG. 5 enables updating of interpolated path 506 based on statistical information generated based on the actual flight of vehicle 502, vehicle 502 may be approved for flights that would be impermissible using a static worst-case tolerance value. For example, if the initial worst-case tolerance parameter value is five meters, first deviation 520 is two meters, second deviation 522 is one meter, and distance 524 is three meters, a flight path based on the initial worst-case tolerance parameter may be rejected because a tolerance associated with an interpolated path would intersect with region 518 (e.g., because distance 524 is less than the initial worst-case tolerance parameter value). However, in an example in accordance with aspects of the present disclosure, a tolerance associated with interpolated path 506 for a third portion from third waypoint 514 to fourth waypoint 516 may be based on first deviation 520, second deviation 522, or a combination thereof, which is less than distance 524, and thus vehicle 502 may be permitted to travel along the requested path (e.g., through waypoints 510-516). As such, aspects disclosed herein increase permissible area of travel of autonomous or semi-autonomous vehicles.

FIG. 6 is a flow diagram illustrating an example process 600 that supports vehicle path deviation reporting and updating according to one or more aspects. Operations of process 600 may be performed by a vehicle or a UE that controls or is integrated within a vehicle, such as UE 115 of FIGS. 1-4, vehicle 401 of FIG. 4, vehicle 502 of FIG. 5, or a vehicle as described with reference to FIG. 8. For example, example operations of process 600 may enable the vehicle to support vehicle path deviation reporting and updating.

At block 602, the vehicle generates movement data based on traversing from a first location to a second location. For example, the movement data may include or correspond to movement data 406 of FIG. 4 The traversing is based on path information that indicates a plurality of waypoints designated to be traversed by the vehicle. For example, the path data may include or correspond to path data 408 of FIG. 4.

At block 604, the vehicle transmits statistical information generated based on the movement data and the plurality of waypoints. The movement data is associated with an actual path of the vehicle and the plurality of waypoints are associated with an interpolated path of the vehicle. For example, the statistical information may include or correspond to statistical information 470 of FIG. 4. In some implementations, the statistical information includes or indicates one or more statistics associated with a deviation between one or more points along the actual path and one or more corresponding points along the interpolated path. In some such implementations, the one or more statistics include a maximum value of the deviation. Additionally or alternatively, the one or more statistics may include a distribution of the deviation. Additionally or alternatively, the one or more statistics may include an average of the deviation. Additionally or alternatively, the one or more statistics may include an average of the deviation.

In some implementations, process 600 further includes performing a comparison of the actual path to the interpolated path and generating the statistical information based on a deviation between the actual path and the interpolated path indicated by the comparison. For example, statistical information 470 of FIG. 4 may be generated based on a deviation between an actual path (represented by movement data 406) and an interpolated path (determined based on path data 408). Additionally or alternatively, process 600 may include determining the interpolated path based on the plurality of waypoints and determining the actual path based on the movement data. The interpolated path is associated with an interpolation type. For example, vehicle 401 may determine the interpolated path based on the waypoints indicated by path data 408, and vehicle 401 may determine the actual path based on movement data 406. In some such implementations, the interpolation type includes linear, geodesic, or spline-based. Additionally or alternatively, process 600 may also include receiving an interpolation indicator from a network entity. The interpolation indicator indicates an interpolation type associated with the interpolated path. For example, the interpolation indicator may include or correspond to interpolation indicator 462 of FIG. 4. Alternatively, process 600 may also include determining an interpolation type associated with the interpolated path based on information received from a network entity. For example, vehicle 401 of FIG. 4 may determine a type of interpolation to use in determining the interpolated path based on information from network entity 450.

In some implementations, process 600 may also include receiving a first mode change request message and transitioning to a statistics reporting mode based on receipt of the mode change request message. The statistical information is transmitted based on operation in the statistics reporting mode. For example, the first mode change request message may include or correspond to mode change request message 472 of FIG. 4. In some such implementations, process 600 may further include receiving a second mode change request message and transitioning from the statistics reporting mode to a static tolerance mode based on receipt of the second mode change request message. A tolerance associated with the interpolated path in the static tolerance mode is based on a tolerance parameter reported by the vehicle. For example, vehicle 401 may transition from the statistics reporting mode (e.g., a first operating mode) to a static tolerance mode (e.g., a second operating mode) based on receipt of a second mode change request message from network entity 450. Alternatively, vehicle 401 may transition from the statistics reporting mode to the static tolerance mode based on receipt of mode change request message 472, and vehicle 401 may transition from the static tolerance mode to the statistics reporting mode based on receipt of a second mode change request message from network entity 450.

In some implementations, process 600 further includes determining a distance between the vehicle and a preconfigured region and transitioning to a statistics reporting mode based on the distance being less than a threshold. The statistical information is transmitted based on operation in the statistics reporting mode. For example, the distance may include or correspond to distance 412 of FIG. 4, and the threshold may include or correspond to one of thresholds 414 of FIG. 4.

FIG. 7 is a flow diagram illustrating an example process 700 that supports vehicle path deviation reporting and updating according to one or more aspects. Operations of process 700 may be performed by a network entity, such as base station 105 of FIGS. 1-3, network entity 450 of FIG. 4, or a network entity as described with reference to FIG. 9. For example, example operations of process 700 may enable the network entity to support vehicle path deviation reporting and updating.

At block 702, the network entity receives path information. The path information indicates a plurality of waypoints designated to be traversed by a vehicle. For example, the path information may include or correspond to path data 408 of FIG. 4.

At block 704, the network entity receives statistical information generated based on movement data of the vehicle and the plurality of waypoints. For example, the statistical information may include or correspond to statistical information 470 of FIG. 4. The movement data is associated with an actual path of the vehicle and the plurality of waypoints are associated with an interpolated path of the vehicle. For example, the movement data may include or correspond to movement data 406 of FIG. 4. In some implementations, the statistical information includes or indicates one or more statistics associated with a deviation between one or more points along the actual path and one or more corresponding points along the interpolated path. The one or more statistics may include a maximum value of the deviation, a distribution of the deviation, an average of the deviation, a standard deviation of the deviation, or a combination thereof. Additionally or alternatively, the statistical information may be received periodically according to a preconfigured periodicity, as described above with reference to FIG. 4.

In some implementations, process 700 further includes determining the interpolated path based on the plurality of waypoints. The interpolated path is associated with an interpolation type. For example, network entity 450 may determine the interpolated path based on waypoints indicated by path data 408, and the interpolated path and updated interpolated path 464 may have an interpolation type that is indicated by interpolation indicator 462 of FIG. 4. In some such implementations, process 700 may also include transmitting an interpolation indicator to the vehicle. The interpolation indicator indicates the interpolation type. For example, the interpolation indicator may include or correspond to interpolation indicator 462 of FIG. 4.

In some implementations, process 700 may further include updating a tolerance parameter associated with the interpolated path based on the statistical information to generate an updated interpolated path. For example, network entity 450 may update a tolerance parameter based on statistical information 470 to generate updated interpolated path 464. In some such implementations, process 700 may also include comparing the updated interpolated path to location information corresponding to a preconfigured region and transmitting an alert to one or more devices based on the updated interpolated path intersecting with the preconfigured region. For example, the preconfigured region may include or correspond to a region indicated by location information 466 of FIG. 4, and the alert may include or correspond to alert 474 of FIG. 4. In some such implementations, the one or more devices include a server, a UE, another network entity, a third party system, or a combination thereof. Additionally or alternatively, process 700 may further include comparing the updated interpolated path to location information corresponding to a preconfigured region and transmitting a termination command to the vehicle based on the updated interpolated path intersecting with the preconfigured region. For example, the location information may include or correspond to location information 466 of FIG. 4, and the termination command may include or correspond to termination command 476 of FIG. 4.

In some implementations, process 700 may also include transmitting a mode change request message to the vehicle. The statistical information is received based on transmission of the mode change request message. For example, the mode change request message may include or correspond to mode change request message 472 of FIG. 4. In some such implementations, the mode change request message is transmitted based on a location of the vehicle along the interpolated path being within a portion of the interpolated path that is a threshold distance from a preconfigured region. For example, the preconfigured region may include or correspond to a preconfigured region indicated by location information 466 of FIG. 4, and the threshold may include or correspond to one of thresholds 468 of FIG. 4.

Figure 8:
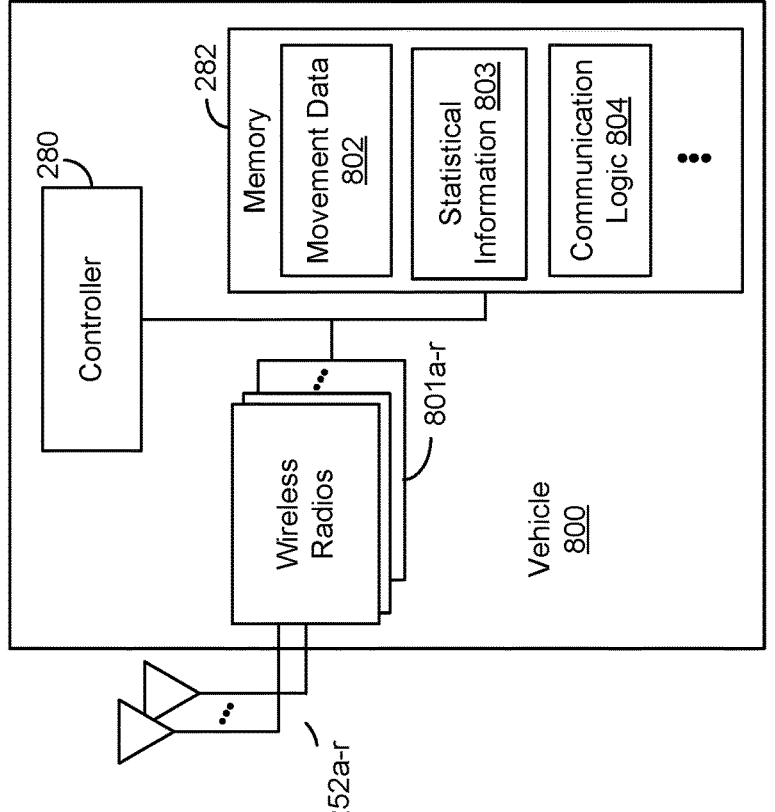
FIG. 8 is a block diagram of an example vehicle that supports vehicle path deviation reporting and updating according to one or more aspects.

FIG. 8 is a block diagram of an example vehicle 800 that supports vehicle path deviation reporting and updating according to one or more aspects. Vehicle 800 may be configured to perform operations, including the blocks of the process described with reference to FIG. 6. In some implementations, vehicle 800 includes the structure, hardware, and components shown and described with reference to UE 115 of FIGS. 1-4, vehicle 401 of FIG. 4, or vehicle 502 of FIG. 5. For example, vehicle 800 may include controller 280, which operates to execute logic or computer instructions stored in memory 282, as well as controlling the components of vehicle 800 that provide the features and functionality of vehicle 800. Vehicle 800, under control of controller 280, transmits and receives signals via wireless radios 801*a-r* and antennas 252*a-r*. Wireless radios 801*a-r* include various components and hardware, as illustrated in FIG. 2 for UE 115, including modulator and demodulators 254*a-r*, transmit processor 264, TX MIMO processor 266, MIMO detector 256, and receive processor 258.

As shown, the memory 282 may include movement data 802, statistical information 803, and communication logic 804. Movement data 802 may include or correspond to movement data 406 of FIG. 4. Statistical information 803 may include or correspond to statistical information 470 of FIG. 4. Communication logic 804 may be configured to enable communication between vehicle 800 and one or more other devices. Vehicle 800 may receive signals from or transmit signals to one or more base stations (e.g., base station 105), one or more network entities (e.g., network entity 450), or network entity 900 of FIG. 9.

Figure 9:
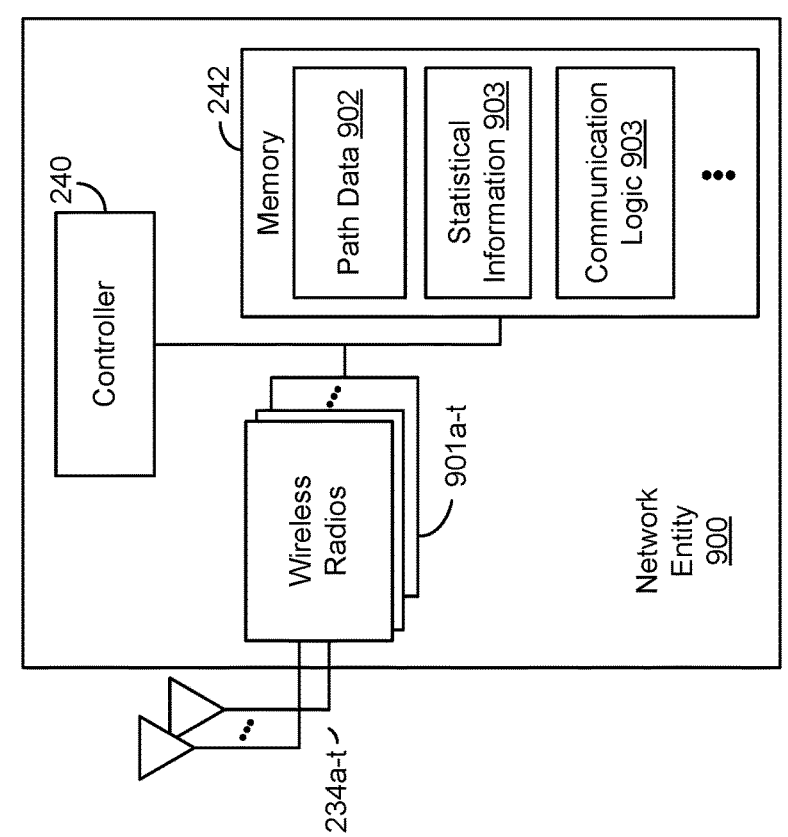
FIG. 9 is a block diagram of an example network entity that supports vehicle path deviation reporting and updating according to one or more aspects.

FIG. 9 is a block diagram of an example network entity 900 that supports vehicle path deviation reporting and updating according to one or more aspects. Network entity 900 may be configured to perform operations, including the blocks of the process described with reference to FIG. 7. In some implementations, network entity 900 includes the structure, hardware, and components shown and described with reference to base station 105 of FIGS. 1-3 or network entity 450 of FIG. 4. For example, network entity 900 may include controller 240, which operates to execute logic or computer instructions stored in memory 242, as well as controlling the components of network entity 900 that provide the features and functionality of network entity 900. Network entity 900, under control of controller 240, transmits and receives signals via wireless radios 901*a-t* and antennas 234*a-t*. Wireless radios 901*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include path data 902, statistical information 903, and communication logic 904. Path data 902 may include or correspond to path data 408 of FIG. 4. Statistical information 903 may include or correspond to statistical information 470 of FIG. 4. Communication logic 904 may be configured to enable communication between network entity 900 and one or more other devices. Network entity 900 may receive signals from or transmit signals to one or more UEs (e.g., UE 115), one or more base stations (e.g., base station 105), one or more network vehicles (e.g., vehicle 401 or vehicle 502), core network 130, or vehicle 800 of FIG. 8.

It is noted that one or more blocks (or operations) described with reference to FIG. 6 or 7 may be combined with one or more blocks (or operations) described with reference to another of the figures. For example, one or more blocks (or operations) of FIG. 6 may be combined with one or more blocks (or operations) of FIG. 7. As another example, one or more blocks associated with FIG. 7 may be combined with one or more blocks (or operations) associated with FIG. 6. Additionally, or alternatively, one or more operations described above with reference to FIG. 1-5 or 8-9 may be combined with one or more operations described with reference to FIGS. 6 and 7.

In one or more aspects, techniques for vehicle path deviation reporting and updating may include additional aspects, such as any single aspect or any combination of aspects described below or in connection with one or more other processes or devices described elsewhere herein. In a first aspect, techniques for vehicle path deviation reporting and updating may include generating movement data based on traversing from a first location to a second location. The traversing is based on path information that indicates a plurality of waypoints designated to be traversed by the vehicle. The techniques may further include transmitting statistical information generated based on the movement data and the plurality of waypoints. The movement data is associated with an actual path of the vehicle, and the plurality of waypoints are associated with an interpolated path of the vehicle. In some examples, the techniques in the first aspect may be implemented in a method or process. In some other examples, the techniques of the first aspect may be implemented in a wireless communication device, such as a vehicle or a device that controls or partially controls a vehicle, which may include a vehicle, a component of a vehicle, a UE, or a component of a UE. For example, the techniques may include or correspond to a method of wireless communication performed by a vehicle. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques include performing a comparison of the actual path to the interpolated path and generating the statistical information based on a deviation between the actual path and the interpolated path indicated by the comparison.

In a third aspect, in combination with the first aspect or the second aspect, the techniques include determining the interpolated path based on the plurality of waypoints. The interpolated path is associated with an interpolation type. The techniques also include determining the actual path based on the movement data.

In a fourth aspect, in combination with the third aspect, the interpolation type includes linear, geodesic, or spline-based.

In a fifth aspect, in combination with one or more of the first aspect through the fourth aspect, the statistical information is transmitted periodically according to a preconfigured periodicity.

In a sixth aspect, in combination with one or more of the first aspect through the fifth aspect, the techniques include receiving a first mode change request message and transitioning to a statistics reporting mode based on receipt of the first mode change request message. The statistical information is transmitted based on operation in the statistics reporting mode.

In a seventh aspect, in combination with the sixth aspect, the techniques include receiving a second mode change request message and transitioning from the statistics reporting mode to a static tolerance mode based on receipt of the second mode change request message. A tolerance associated with the interpolated path in the static tolerance mode is based on a tolerance parameter reported by the vehicle.

In an eighth aspect, in combination with one or more of the first aspect through the seventh aspect, the techniques include determining a distance between the vehicle and a preconfigured region and transitioning to a statistics reporting mode based on the distance being less than a threshold. The statistical information is transmitted based on operation in the statistics reporting mode.

In a ninth aspect, in combination with the eighth aspect, the preconfigured region is associated with a particular location, a particular device, a particular structure, or a particular geofence.

In a tenth aspect, in combination with one or more of the first aspect through the ninth aspect, the statistical information indicates one or more statistics associated with a deviation between one or more points along the actual path and one or more corresponding points along the interpolated path.

In an eleventh aspect, in combination with the tenth aspect, the one or more statistics include a maximum value of the deviation.

In a twelfth aspect, in combination with the tenth aspect or the eleventh aspect, the one or more statistics include a distribution of the deviation.

In a thirteenth aspect, in combination with one or more of the tenth aspect through the twelfth aspect, the one or more statistics include an average of the deviation.

In a fourteenth aspect, in combination with one or more of the tenth aspect through the thirteenth aspect, the one or more statistics include an average of the deviation.

In a fifteenth aspect, in combination with one or more of the first aspect through the fourteenth aspect, the techniques include receiving an interpolation indicator from a network entity. The interpolation indicator indicates an interpolation type associated with the interpolated path.

In a sixteenth aspect, in combination with one or more of the first aspect through the fourteenth aspect, the techniques include determining an interpolation type associated with the interpolated path based on information received from a network entity.

In a seventeenth aspect, techniques for vehicle path deviation reporting and updating may include receiving path information. The path information indicates a plurality of waypoints designated to be traversed by a vehicle. The techniques may further include receiving statistical information generated based on movement data of the vehicle and the plurality of waypoints. The movement data is associated with an actual path of the vehicle, and the plurality of waypoints are associated with an interpolated path of the vehicle. In some examples, the techniques in the seventeenth aspect may be implemented in a method or process. In some other examples, the techniques of the seventeenth aspect may be implemented in a wireless communication device, such as a network entity, which may include a base station, a component of a base station, a RSU, a component of a RSU, a server, a component of a server, a core network, or a component of a core network, as non-limiting examples. For example, the techniques may include or correspond to a method of wireless communication performed by a network entity. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In an eighteenth aspect, in combination with the seventeenth aspect, the techniques further include determining the interpolated path based on the plurality of waypoints. The interpolated path is associated with an interpolation type.

In a nineteenth aspect, in combination with the eighteenth aspect, the techniques include transmitting an interpolation indicator to the vehicle. The interpolation indicator indicates the interpolation type.

In a twentieth aspect, in combination with one or more of the seventeenth aspect through the nineteenth aspect, the techniques include updating a tolerance parameter associated with the interpolated path based on the statistical information to generate an updated interpolated path.

In a twenty-first aspect, in combination with the twentieth aspect, the techniques include comparing the updated interpolated path to location information corresponding to a preconfigured region and transmitting an alert to one or more devices based on the updated interpolated path intersecting with the preconfigured region.

In a twenty-second aspect, in combination with the twenty-first aspect, the one or more devices include a server, a UE, another network entity, a third party system, or a combination thereof.

In a twenty-third aspect, in combination with the twentieth aspect through the twenty-second aspect, the techniques include comparing the updated interpolated path to location information corresponding to a preconfigured region and transmitting a termination command to the vehicle based on the updated interpolated path intersecting with the preconfigured region.

In a twenty-fourth aspect, in combination with one or more of the seventeenth aspect through the twenty-third aspect, the statistical information indicates one or more statistics associated with a deviation between one or more points along the actual path and one or more corresponding points along the interpolated path.

In a twenty-fifth aspect, in combination with the twenty-fourth aspect, the one or more statistics include a maximum value of the deviation, a distribution of the deviation, an average of the deviation, a standard deviation of the deviation, or a combination thereof.

In a twenty-sixth aspect, in combination with one or more of the seventeenth aspect through the twenty-fifth aspect, the statistical information is received periodically according to a preconfigured periodicity.

In a twenty-seventh aspect, in combination with one or more of the seventeenth aspect through the twenty-sixth aspect, the techniques include transmitting a mode change request message to the vehicle. The statistical information is received based on transmission of the mode change request message.

In a twenty-eighth aspect, in combination with the twenty-seventh aspect, the mode change request message is transmitted based on a location of the vehicle along the interpolated path being within a portion of the interpolated path that is a threshold distance from a preconfigured region.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a vehicle, the method comprising:

generating movement data based on traversing from a first location to a second location, the traversing based on path information that indicates a plurality of waypoints designated to be traversed by the vehicle, the movement data based at least in part on one or more global positioning system (GPS) receivers;

performing a comparison of an actual path to an interpolated path; and generating statistical information based on a deviation between the actual path and the interpolated path indicated by the comparison; and transmitting the statistical information, the movement data associated with an actual path of the vehicle, and the plurality of waypoints associated with the interpolated path of the vehicle.

2. The method of claim 1, further comprising:

determining the interpolated path based on the plurality of waypoints, the interpolated path associated with an interpolation type; and determining the actual path based on the movement data.

3. The method of claim 2, wherein the interpolation type includes linear, geodesic, or spline-based.

4. The method of claim 1, wherein the statistical information is transmitted periodically according to a preconfigured periodicity.

5. The method of claim 1, further comprising:

receiving a first mode change request message; and transitioning to a statistics reporting mode based on receipt of the first mode change request message, wherein the statistical information is transmitted based on operation in the statistics reporting mode.

6. The method of claim 5, further comprising:

receiving a second mode change request message; and transitioning from the statistics reporting mode to a static tolerance mode based on receipt of the second mode change request message, wherein a tolerance associated with the interpolated path in the static tolerance mode is based on a tolerance parameter reported by the vehicle.

7. The method of claim 1, further comprising:

determining a distance between the vehicle and a preconfigured region; and transitioning to a statistics reporting mode based on the distance being less than a threshold, wherein the statistical information is transmitted based on operation in the statistics reporting mode.

8. The method of claim 7, wherein the preconfigured region is associated with a particular location, a particular device, a particular structure, or a particular geofence.

9. A vehicle comprising:

a memory storing processor-readable code; and at least one processor coupled to the memory, the at least one processor configured to execute the processor-readable code to cause the at least one processor to:

generate movement data based on traversing from a first location to a second location, the traversing based on path information that indicates a plurality of waypoints designated to be traversed by the vehicle, the movement data based at least in part on one or more global positioning system (GPS) receivers;

perform a comparison of an actual path to an interpolated path; and generate statistical information based on a deviation between the actual path and the interpolated path indicated by the comparison; and transmit the statistical information, the movement data associated with an actual path of the vehicle, and the plurality of waypoints associated with the interpolated path of the vehicle.

10. The vehicle of claim 9, wherein the statistical information indicates one or more statistics associated with a deviation between one or more points along the actual path and one or more corresponding points along the interpolated path.

11. The vehicle of claim 10, wherein the one or more statistics include a maximum value of the deviation.

12. The vehicle of claim 10, wherein the one or more statistics include a distribution of the deviation.

13. The vehicle of claim 10, wherein the one or more statistics include an average of the deviation.

14. The vehicle of claim 10, wherein the one or more statistics include an average of the deviation.

15. The vehicle of claim 9, wherein the at least one processor is configured to execute the processor-readable code to cause the at least one processor to:

receive an interpolation indicator from a network entity, the interpolation indicator indicating an interpolation type associated with the interpolated path.

16. The vehicle of claim 9, wherein the at least one processor is configured to execute the processor-readable code to cause the at least one processor to:

determine an interpolation type associated with the interpolated path based on information received from a network entity.

* * * * *